US010673711B2

(12) United States Patent
Letham et al.

(10) Patent No.: US 10,673,711 B2
(45) Date of Patent: Jun. 2, 2020

(54) RESOURCE PROVISIONING PLATFORM WITH OPTIMIZED BUNDLING

(71) Applicant: International Business Machines Corporation, Armonk, NY (US)

(72) Inventors: Benjamin Letham, Cambridge, MA (US); Anshul Sheopuri, Bergen, NJ (US); Wei Sun, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/824,486

(22) Filed: Nov. 28, 2017

(65) Prior Publication Data

US 2019/0166018 A1 May 30, 2019

(51) Int. Cl.

*H04L 12/24* (2006.01)
*H04L 12/26* (2006.01)
*G06Q 30/02* (2012.01)
*G06Q 10/06* (2012.01)

(52) U.S. Cl.

CPC ....... *H04L 41/5054* (2013.01); *G06Q 10/063* (2013.01); *G06Q 30/0202* (2013.01); *H04L 41/5045* (2013.01); *H04L 43/06* (2013.01)

(58) Field of Classification Search

CPC ........................... H04L 41/5054; H04L 43/06
USPC .......................................................... 709/226
See application file for complete search history.

(56) References Cited

U.S. PATENT DOCUMENTS 7,263,496 B1 * 8/2007 Weigelt .................. G06Q 10/06 705/7.25
8,489,742 B2 * 7/2013 Clubb ..................... G06F 9/505 709/223
2002/0055865 A1 * 5/2002 Hammann ............ G06Q 10/06 705/7.37
2004/0088239 A1 * 5/2004 Eder ...................... G06Q 10/04 705/36 R
2007/0208602 A1 * 9/2007 Nocera ............ G06Q 10/06311 705/7.26
2012/0131591 A1 * 5/2012 Moorthi ................ G06Q 10/06 718/104
2015/0081424 A1 3/2015 Letham

* cited by examiner

*Primary Examiner* — Minh Chau Nguyen
(74) *Attorney, Agent, or Firm* — Reza Sarbakhsh

(57) ABSTRACT

A system, method and program product for bundling resources for a resource provisioning platform. A system is disclosed that includes a plurality of resources, wherein each resource belongs to one of a plurality of categories; a bundling system having: a data collection system that gathers historical transaction data associated with the resources; an analysis system that analyzes the historical transaction data to assign estimated valuations to different bundles of resources and includes (a) a substitution effect analyzer to analyze a substitution effect of resources in each category using discrete choice modeling and marginal value estimation, and (b) a joint dependence analyzer that determines intra-category and inter-category joint dependent inferences across all resources; and a bundle selection system that selects a set of bundles for provisioning based on the estimated valuations.

20 Claims, 8 Drawing Sheets

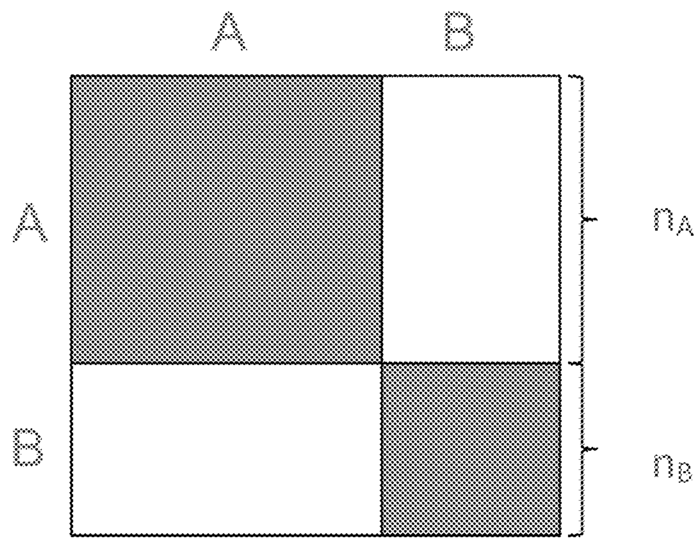

Figure 4

$$\ell_{ij}(\hat{\boldsymbol{\theta}}, \boldsymbol{\phi}) = \sum_{t=1}^{T} \log \int \int p(y_i^t, y_j^t \mid v_i^t, v_j^t, \hat{\boldsymbol{\theta}}, \boldsymbol{\phi}) p(v_i^t, v_j^t, \hat{\boldsymbol{\theta}}, \boldsymbol{\phi}) dv_i^t dv_j^t$$

$$= \sum_{t=1}^{T} \log \int \int p(y_i^t \mid v_i^t, \hat{\boldsymbol{\theta}}^A) p(y_j^t \mid v_j^t, \hat{\boldsymbol{\theta}}^B) \underbrace{f(v_i^t, v_j^t; \hat{\boldsymbol{\theta}}, \boldsymbol{\phi}) dv_i^t dv_j^t}_{\text{Copula Density Function}},$$

Figure 5

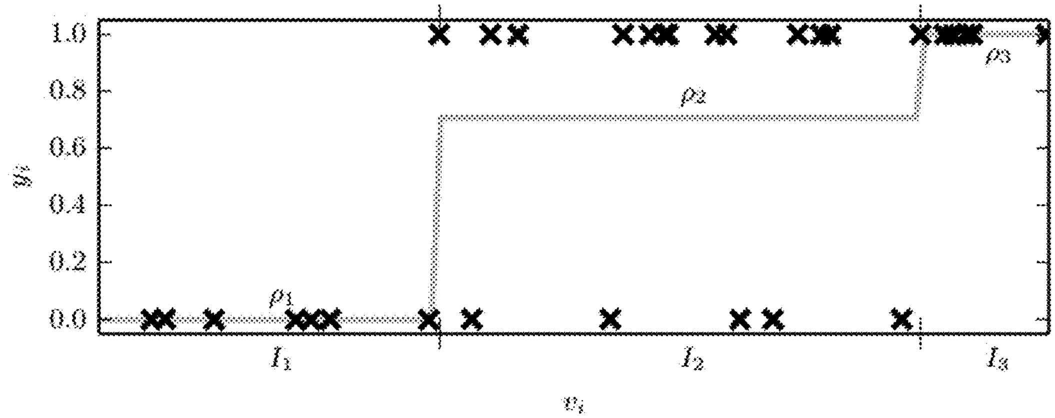

Figure 6

Estimated using CART, $$\lambda_q^{A,t} = (\rho_q^{A,t})^{y_i^t}(1-\rho_q^{A,t})^{(1-y_i^t)}.$$

We denote the upper and lower bounds of interval $I_q^{A,t}$ as $\delta_q^{A,t,\ell}$ and $\delta_q^{A,t,u}$ respectively $$\ell_{ij}(\hat{\boldsymbol{\theta}}, \boldsymbol{\phi}) = \sum_{t=1}^{T} \log \sum_{q_A=1}^{Q} \sum_{q_B=1}^{Q} \lambda_{q_A}^{A,t} \lambda_{q_B}^{B,t} \int_{\delta_{q_A}^{A,t,\ell}}^{\delta_{q_A}^{A,t,u}} \int_{\delta_{q_B}^{B,t,\ell}}^{\delta_{q_B}^{B,t,u}} f(v_i^t, v_j^t; \hat{\boldsymbol{\theta}}, \boldsymbol{\phi} \mid \boldsymbol{z}^t) dv_i^t dv_j^t$$

Figure 7

| | Coefficient (std. err.) | Coefficient (std. err.) |
|---|---|---|
| *Variable* | Multinomial Logit | Mixed Logit |
| | *Mean effects* | |
| *Phone Price* | −3.748 (0.089)*** | −4.404 (0.135)*** |
| *Volume* | −4.019 (0.195)* | −5.958 (0.333)*** |
| *Weight* | 0.033 (0.005)** | 0.079 (0.008)** |
| *Screen size* | −0.809 (0.101)*** | −0.835 (0.112)*** |
| *Screen resolution* | 1.559 (0.091)*** | 1.851 (0.104)*** |
| *OS: Android = 1* | 1.415 (0.088)*** | 1.689 (0.249)*** |
| *OS: iOS = 2* | 1.462 (0.087)*** | 1.738 (0.250)*** |
| *CPU Speed* | 0.432 (0.074)*** | 0.640 (0.093)*** |
| *Core* | 2.609 (0.072)*** | 3.210 (0.111)*** |
| *RAM* | −2.937 (0.141)*** | −3.479 (0.181)** |
| *Internal storage* | 1.874 (0.040)*** | 2.259 (0.067)*** |
| *External storage* | 0.270 (0.016)*** | 0.169 (0.021)*** |
| *Primary camera* | 0.221 (0.013)*** | 0.246 (0.017)*** |
| *Secondary camera* | −0.324 (0.053)* | −0.092 (0.061) |
| *Talk time* | 0.300 (0.014)*** | 0.384 (0.018)*** |
| *Age*(L) | 4.518 (0.280)*** | 5.778 (0.399)*** |
| *Age Square*(L) | −1.926 (0.123)*** | −2.383 (0.172)*** |
| | *Distribution of parameters across consumers* | |
| *Weight* | | 0.011 (0.002)*** |
| *Screen size* | | 0.806 (0.077)*** |
| *Screen resolution* | | 0.675 (0.066)*** |
| *Primary camera* | | 0.184 (0.013)*** |
| *Core* | | 0.006 (0.057) |
| *Internal storage* | | 0.025 (0.074) |
| *Talk time* | | 0.106 (0.013)*** |
| *Age*(L) | | 0.335 (0.050)*** |
| | *Alternative specific constants* | |
| *iPhone New* | 15.796 (0.587)*** | 23.412 (1.011)*** |
| *iPhone Legacy* | 14.668 (0.586)*** | 22.010 (1.003)*** |
| *iPhone Legacy 2* | 13.795 (0.590)*** | 20.859 (1.001)*** |
| *Samsung Note* | 19.619 (0.979)*** | 28.290 (1.553)*** |
| *Samsung S New* | 11.879 (0.725)*** | 20.106 (1.213)*** |
| *Samsung S Legacy* | 11.039 (0.714)*** | 19.354 (1.208)*** |
| *Samsung Others* | 14.356 (0.738)*** | 23.590 (1.256)*** |
| *Sony* | 8.737 (0.672)** | 16.324 (1.115)** |
| *HTC* | 7.236 (0.664)** | 13.732 (1.066)** |
| *RIM* | 14.686 (0.727)*** | 23.097 (1.263)*** |
| *Others* | 13.659 (0.725)* | 20.820 (1.183)** |
| *Log-Likelihood* | −76,075.160 | −75,977.850 |

*Number of observations = 44,648* *p<0.1; p<0.05; *p<0.01

Figure 9

| | Sales (%) | Relative Revenue | Coef. Variation on Revenue |
|---|---|---|---|
| *Base plan* | 96.91 | 1 | 0.125 |
| *Upgraded plan* | 3.09 | 1.24 | 0.250 |

| | Coefficient (std. err.) |
|---|---|
| *Upgraded plan: Constant* | −5.747 (0.425)*** |
| *Price* | −1.459 (0.379)*** |
| *Quota* | 1.931 (0.261)** |
| *Upgraded plan: Contract Type (1=Renewal)* | 0.527 (0.150)*** |
| *Log Likelihood* | −8818.1 |
| *Number of observations = 38,747* | *p<0.1; **p<0.05; ***p<0.01 |

*Note.* The reference level for the choice set is *Base Plan*.

| *Phone Model* | *Upgraded Plan* | *Base Plan* |
|---|---|---|
| *iPhone New* | 0.238 | −0.215 |
| *iPhone Legacy 1* | 0.119 | −0.187 |
| *iPhone Legacy 2* | 0.013 | −0.091 |
| *Samsung Note* | 0.177 | −0.213 |
| *Samsung S New* | 0.151 | −0.205 |
| *Samsung S Legacy* | 0.081 | −0.022 |
| *Samsung Other* | −0.055 | 0.090 |
| *HTC* | 0.227 | −0.171 |
| *RIM* | −0.020 | 0.092 |
| *Sony* | 0.025 | −0.023 |
| *Others* | −0.014 | 0.011 |

Figure 10

RESOURCE PROVISIONING PLATFORM WITH OPTIMIZED BUNDLING

TECHNICAL FIELD

The subject matter of this invention relates to the provisioning of resources and more particularly to a system and method of calculating optimizing bundles of resources to maximize performance of a provisioning platform.

BACKGROUND

Resource provisioning platforms, such as cloud computing models, network architectures, servers, Internet of Things (IoT) systems, autonomous fleet management systems, distribution systems, sales models, etc., typically make available a set of resources to facilitate a solution for client nodes. Often such platforms will offer competing resources having similar capabilities. For example, in a cloud computing environment, there may be different memory offerings, different processor offerings, different security options, etc. Similarly, in an IoT environment, a resource platform may offer independently developed software agents that, e.g., control operations, manage network communications, etc. Because there may exist numerous competing resources within different categories of resources, it may be necessary for the system to select or bundle resources from different resource categories to simplify the number of possible solutions offered by the platform.

To maximize performance, a solution is thus required that can optimally select a manageable set of resource bundle options. However, because the number of potential bundles increases exponentially with the number of categories, the ability to optimally select and bundle resources to maximize the overall efficiency of the system can be challenging. Furthermore, resource provisioning platforms may be subject to inter-category and intra-category dependencies. For example, the demand of one bundle that selects a particular type of memory chips may be influenced by other bundles which use slightly different types of memory chips (i.e., intra-category dependencies). Similarly, offering a particular type of storage in one bundle may impact the provisioning of security solutions in other bundles (i.e., inter-category dependencies). Accordingly, efficiently bundling resources to achieve high performance remains a challenge.

SUMMARY

Aspects of the disclosure provide a resource provisioning platform that manages resources and includes a bundling system for determining a set of bundles to be offered by the platform for provisioning to client nodes. Using an optimized approach as described herein improves the technical performance of the platform.

A first aspect discloses resource provisioning platform, including: a plurality of resources, wherein each resource belongs to one of a plurality of categories; a bundling system having: a data collection system that gathers historical transaction data associated with the resources; an analysis system that analyzes the historical transaction data to assign estimated valuations to different bundles of resources and includes (a) a substitution effect analyzer to analyze a substitution effect of resources in each category using discrete choice modeling and marginal value estimation, and (b) a joint dependence analyzer that determines intra-category and inter-category joint dependent inferences across all resources; and a bundle selection system that selects a set of bundles for provisioning based on the estimated valuations.

A second aspect discloses a computer program product stored on a computer readable storage medium, which when executed by a computing system, provides bundling options for a resource provisioning platform, the program product comprising: program code that collects historical transaction data of resources; program code that calculates a substitution effect of resources in different categories using discrete choice modeling and marginal value estimation; program code that determines intra-category and inter-category joint dependence inferences across all resources; and program code that selects a set of bundles for provisioning based on the substitution effect and intra-category and inter-category joint dependent inferences.

A third aspect discloses a computerized method of bundling resources for a resource provisioning platform, the program product comprising: collecting historical utilization data of resources; calculating a substitution effect of resources in different categories using discrete choice modeling and marginal value estimation; determining intra-category and inter-category joint dependence inferences across all resources; and selecting a set of bundles for provisioning based on the substitution effect and intra-category and inter-category joint dependent inferences.

BRIEF DESCRIPTION OF THE DRAWINGS

These and other features of this invention will be more readily understood from the following detailed description of the various aspects of the invention taken in conjunction with the accompanying drawings in which:

FIG. 4 shows a covariance matrix example according to embodiments.

FIG. 5 shows a Copular density function according to embodiments.

FIG. 6 shows a CART regression tree algorithm result according to embodiments.

FIG. 7 shows a CART estimation algorithm according to embodiments.

FIG. 9 shows an illustrative demand model for a category according to embodiments.

FIG. 10 shows an illustrative demand model for a second category, estimation results and cross-correlated valuations according to embodiments.

Figure 1:
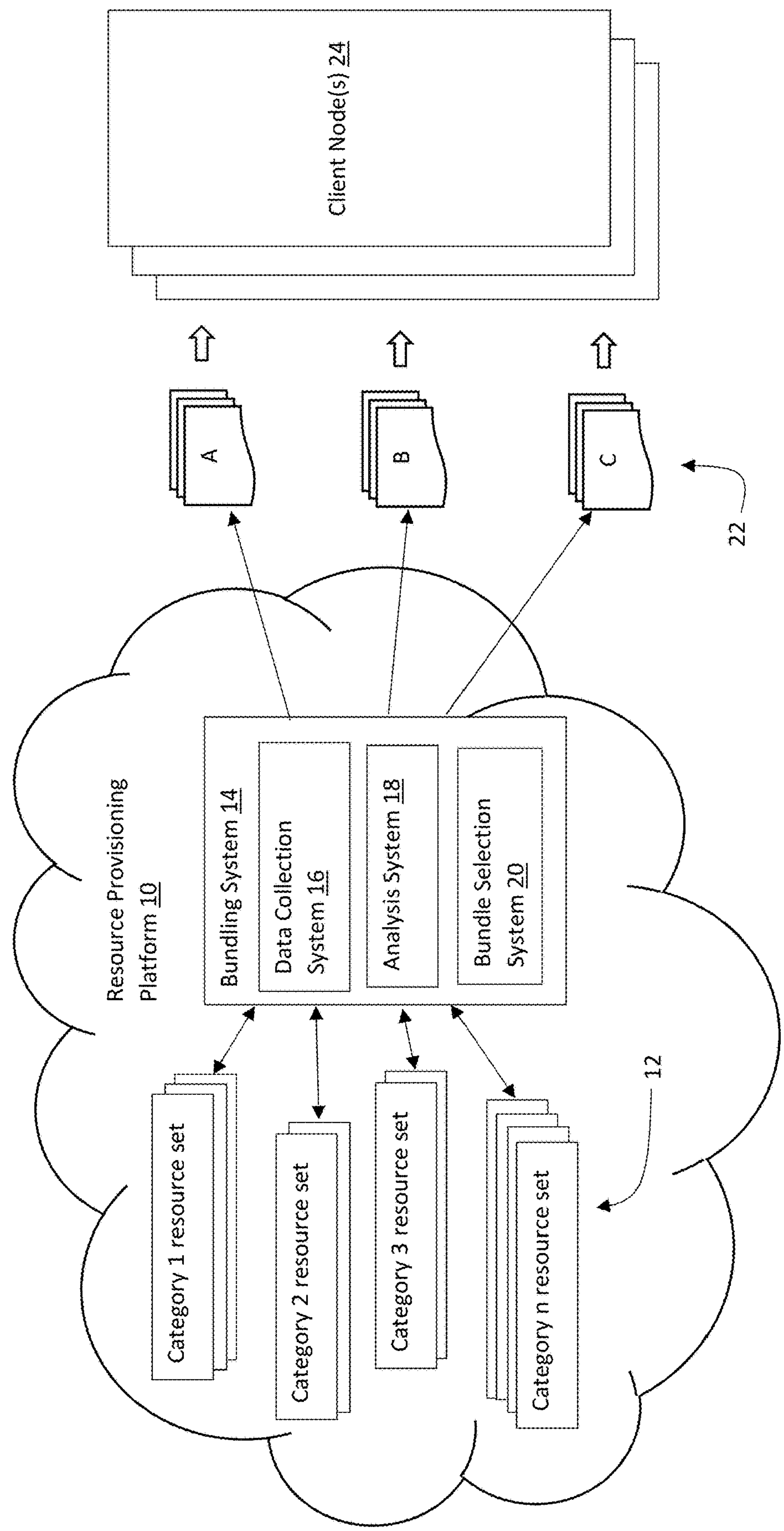
FIG. 1 shows a resource provisioning platform according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a high level overview of a resource provisioning platform 10 that utilizes a bundling system 14 to create a set of resource bundle options 22 available for provisioning to a client node 24. Resource provisioning platform 10 may include any platform that manages and provisions resources, e.g., a cloud computing platform, a network infrastructure, a server, an Internet of Things (IoT) platform, an autonomous vehicle manager, a distribution system, a sales platform, etc. Resource provisioning platform 10 generally includes or manages different categories of resources, shown as resource sets (e.g., category 1 resource set, category 2 resource set, . . . category n resource set). Each category includes similar types of resources, which may for example compete against each other. For instance, in a cloud computing platform, category 1 resource set may include different types of data storage (e.g., backup, encrypted, etc.) category 2 resource set may include different types of processors (e.g., multi-threaded, floating point, etc.), category 3 resource set may include different connectivity options (e.g., high bandwidth, low bandwidth, etc.), and so forth.

Client node 24 may comprise any platform or entity that requires a bundle of resources to achieve a solution (e.g., a cloud computing client, an autonomous vehicle, an IoT device, a smart device, a consumer, etc.). Each bundle generally includes resources selected from a set of categories (e.g., a cloud computing bundle may include x type storage+y type processing+z type connectivity). A significant challenge results from the fact that the number of categories and resource options in each category may lead to a large number of potential bundles 22, which is both inefficient for the resource provisioning platform 10 and the client node 24. For instance, assume resource provisioning platform 10 provides on demand software agents to provide services to autonomous vehicle (i.e., client nodes 24). The autonomous vehicle may need to download a navigation agent, a language agent, and a payment agent. Attempting to sort through a myriad of available resources in each category from the resource provisioning platform 10 to identify an optimal bundle of agents would be overly burdensome for the vehicle 24. Instead, bundling system 14 provides a manageable set of bundle options 22 that can be easily evaluated by the vehicle, e.g., to meet performance targets.

Similarly, from the resource provisioning platform 10 perspective, delivering bundles of resources in an ad hoc manner leads to substantial inefficiencies, e.g., resource depletions, performance degradation, lost profitability, etc. To address this, bundling system 14 is utilized to automatically select a manageable set of bundle options 22. In this illustrative embodiment, bundling system 14 includes a data collection system 16 that captures and stores transaction data such as past utilization data, demand data, sales data, etc., from the various resources managed by the resource provisioning platform 10, an analysis system 18 that analyzes the transaction data to evaluate potential bundle offerings, and a bundle selection system 20 that selects the bundle options 22 and assigns an optimized utilization schedule (e.g., usage parameters, price, etc.) to each bundle option 22.

Figure 2:
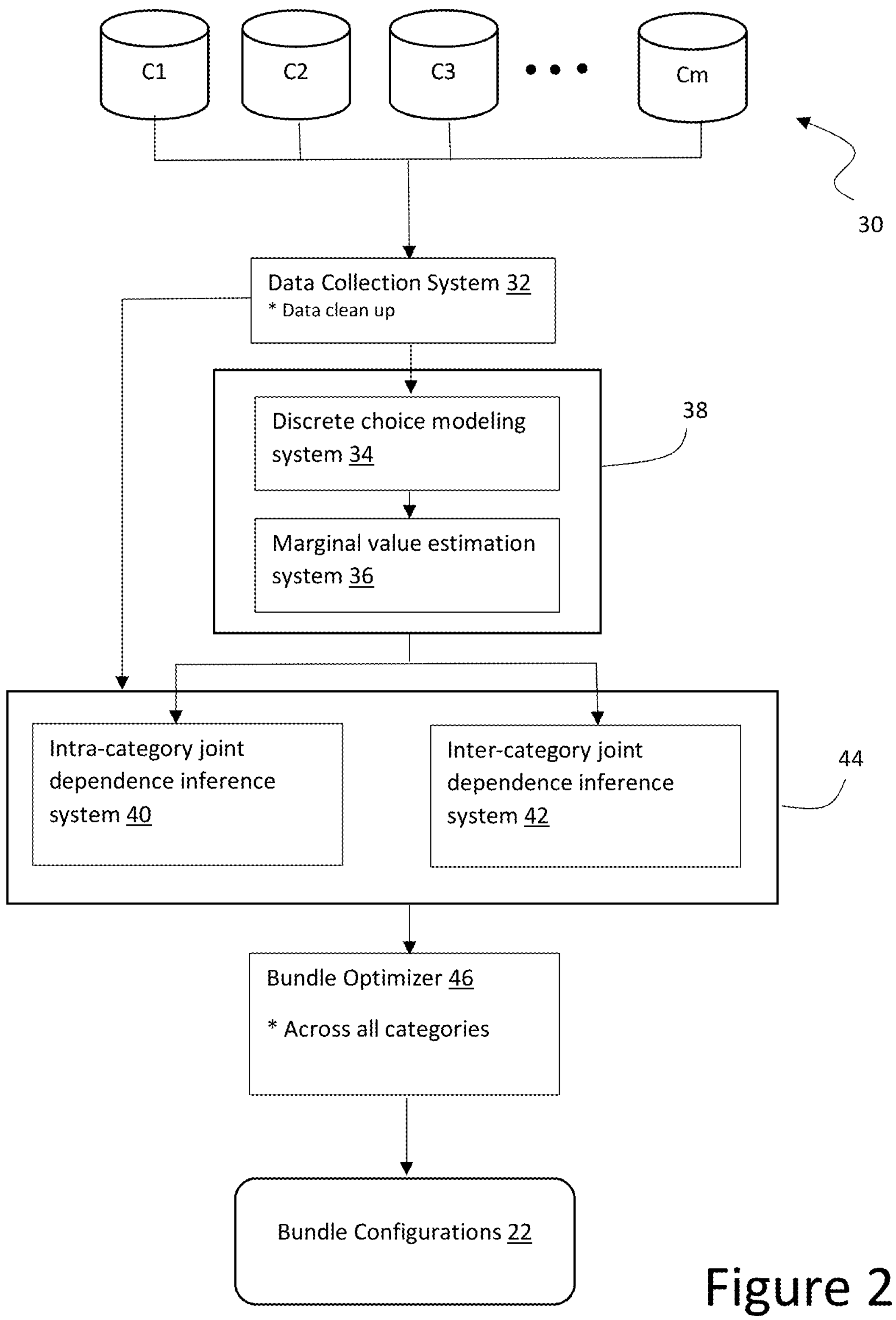
FIG. 2 shows a flow diagram of a bundling analysis process according to embodiments.

FIG. 2 depicts a more detailed embodiment of the bundling system 14 of FIG. 1. As shown, data collection system 16 is utilized to collect transaction data for resources across all categories 30. Transaction data may for example include how often a resource was provisioned, what were the terms of the provisioning, wear and tear, sales data, etc. As part of the data collection process, a data clean-up operation may be performed in which missing data may be inferred, outliers may be excluded, errors may be corrected, etc.

Once collected, a substitution effect analyzer 38 is utilized to capture the substitution effect within each category and calculate marginal valuations. In this embodiment, a discrete choice modeling system 34 and marginal value estimation system 36 are utilized to extract marginal valuations for individual resources to capture the substitution effect with a category.

Discrete choice modeling comprises a known approach to estimate demand for differentiated items. Illustrative models include multinomial logit (MNL) models and mixed logit (ML) models. The concept is based on utility maximization μ in which the client node 24 "t" obtains a certain amount of utility μ from each alternative i and selects the alternative with the maximum utility. In one example, valuation which is the measure of preference in dollar terms that does not take price into account, and can be directly derived from the utility functions. For example, using MNL, the utility function:

$$\mu_i^t=\bar{\mu}_i^t+\alpha x_i^t+\varepsilon_i^t$$

Which comprises (mean utility μ excluding price)+(price x)+(extreme value iid or error term ε) gives the valuation function v:

$$\upsilon_i^t=\frac{1}{|\alpha|}(\bar{\mu}_i^t+\varepsilon_i^t)$$

Using ML, the utility function, $$\mu_i^t=\bar{\mu}_i^t+\alpha x_i^t+u'_t z_i^t+\varepsilon_i^t$$

provides a random vector with 0 mean and covariance and gives the valuation function:

$$\upsilon_i^t=\frac{1}{|\alpha|}(\bar{\mu}_i^t+u'_t z_i^t+\varepsilon_i^t)$$

Once the marginal valuations are calculated, a joint dependence analyzer 44 is employed within and across categories to determine joint valuations across all resources. In this example, intra-category 40 and inter-category 42 joint dependence inference systems are employed. Once the joint valuation across all products are determined, a bundle selection system 46 is employed to output an optimal set of bundles subject to any set constraints, e.g., maximum number of bundles, resource quantity limitations, price, etc.

The result is a statistically consistent and computationally tractable inference solution for estimating the joint valuation of resources in a bundle using only existing transaction data. Moreover, the solution is flexible in that no restrictive modeling assumptions are utilized. The solution incorporates an intra-category substitution effect where each bundling resource could face competition from similar resources in the same category. This approach integrates well with choice models, such as multinomial logit model and mixed logit model.

Figure 3:
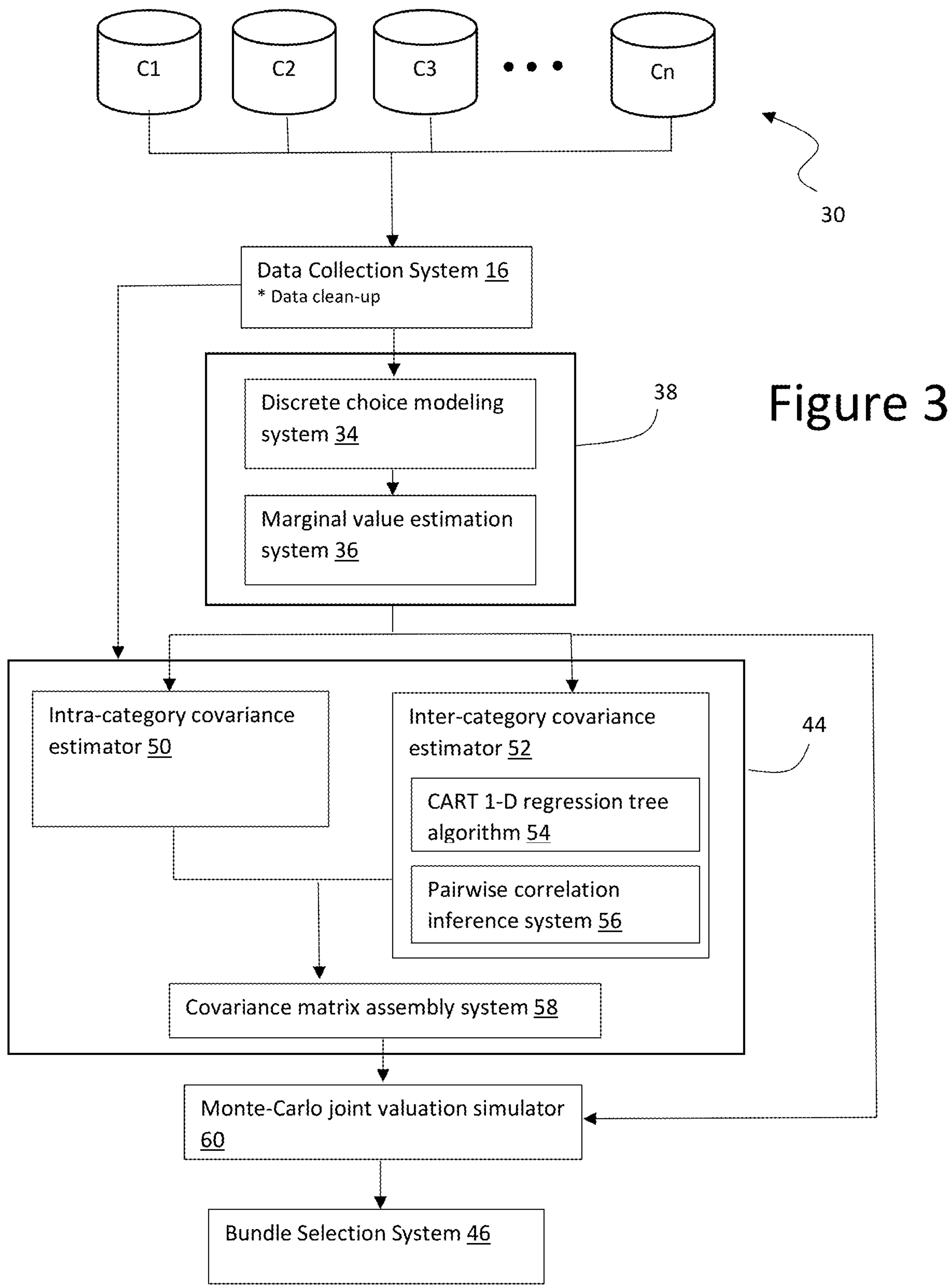
FIG. 3 shows a flow diagram of a further detailed bundling analysis process according to embodiments.

FIG. 3 depicts a more detailed illustrative embodiment of the system for determining joint dependence 44. In this embodiment, an intra-category covariance estimator 50 and inter-category covariance estimator 52 are utilized to separately estimate sub-block matrices that represent the intra-category substitution and inter-category correlation effects. The results are then assembled into a full covariance matrix by covariance matrix assembly system 58. The resulting full covariance matrix is fed into a Monte-Carlo joint valuation simulator 60.

FIG. 4 depicts an example of covariance matrix of form:

$$\Sigma_{l=1}^{N} n_l \times \Sigma_{l=1}^{N} n_l$$

(in this case for two categories A and B) in which the shaded regions represent an intra-category covariance matrix which captures the substitution effect within a category derived from the output of the choice model, e.g., using MNL that provides a diagonal matrix with identical elements. The procedure consists of estimating marginal valuation distributions and a covariance matrix that describes the pairwise dependence of products within and across the categories. The unshaded regions represent an inter-category covariance matrix in which each element captures a pairwise correlation between resources from different categories. Each correlation value is estimated with a modified Copula inference procedure.

For example, the equation in FIG. 5 may be employed to provide such a modified fitting procedure to find:

$$\hat{\phi}_{ij} \in \underset{\phi}{\operatorname{argmax}}\, \ell_{ij}(\hat{\theta}, \phi)$$

The equation includes a Copula density function as shown in FIG. 5 and, as is evident, correlation values are not deterministic. For example, in a category with competing resources, knowing one resource's valuation alone does not determine a demand or purchase decision.

As shown in FIG. 5, inter-category covariance estimator 52 includes a CART 1-D regression tree algorithm 54 and pairwise correlation inference system 56, to, e.g., estimate a demand or purchase probability p given a valuation v $$p(y_i^t | v_i^l, \hat{\theta}^A).$$

Using the simulated valuations for all resources within a category from the discrete choice modeling system 34, a demand or purchase decision is calculated for a set of inputs (such as price). For a given resource i, CART can be used to fit a one-dimensional regression tree, e.g., a regression tree of size Q segments the space into Q disjoint segments and provides a constant estimate over each interval. The estimate of the marginal purchase probability can be made arbitrarily accurate by increasing N and the number of CART splits Q. FIG. 6 depicts an illustrative CART regression tree with Q=3 to fit the simulation results, which provides a piecewise constant estimate.

Using the Copula equation of FIG. 5 and an estimate using CART results, the integral equation shown in FIG. 7 can be realized. The integral can be transformed into cumulative distribution function (cdf) valuations, which can be evaluated quickly.

Monte-Carlo joint valuation simulator 60 is then used to provide bundle selection optimization (e.g., based on demand, price, etc.). Except for very small problem instances, it is generally very complex to characterize an expected profit function generated by all bundles and their individual resources. Assuming N categories, each category l consists of $n_l$ competing resources. First, K samples are drawn from the estimated joint distribution where each sample represents a client node's valuations towards all resources:

$$\Sigma_{l=1}^{N} n_l$$

A surplus for each resource is the difference between the realized valuations and the prices which are decision variables. Constraints are set such that a client node selects at most one resource from each category and chooses the resources or bundle that gives the maximum surplus. The expected profit is then simply the average profit generated by K client nodes. Bundles selection system 46 can then, e.g., select the n most profitable bundles.

As a simple sales models example, assume resource provisioning platform 10 of FIG. 1 is responsible for generating smart phone plans for consumer offerings. Historical transaction data would include purchase data involving phones and plans. When signing up for a service contract, a customer has the option of purchasing a phone at a discounted price. The price for every contract only depends on the services a customer selects and is independent of the phone choices. The monetary incentive of signing up a two year contract is the discounted price on the phone. A service contract and a phone purchase is referred to be a bundle. A mixed logit (ML) model can be used to estimate the distribution of consumer preferences towards different phone characteristics. In this model, the utility for consumer t from choosing phone i can be represented as $$\mu_i^t = \beta'_t X_i^t + \gamma' Y_i^t + \varepsilon_i^t, \text{ where } X_i^t \text{ and } Y_i^t$$

where X and Y are vectors of observable characteristics that relate to phone i and consumer t, and ε is an unobserved random term that is distributed iid extreme value, independent of other terms. The coefficients B are random and vary over consumers in the population with density f(B), parameterized by its mean b and covariance W. The coefficients λ represent a vector of fixed coefficients with respect to observable characteristics Y.

FIG. 9 depicts a demand model for phone features that provide estimates of mean utility levels for different features using MNL and ML. FIG. 10 depicts a demand model for two possible data plans. The middle table shows estimation results using the MNL model to construct a discrete choice model. Note that utility of the upgrade contract is 0.527 (i.e., higher) relative to the base plan for the resource provisioning system. The third table shows cross-category correlation estimates involving eleven phones and two data plans.

Figure 8:
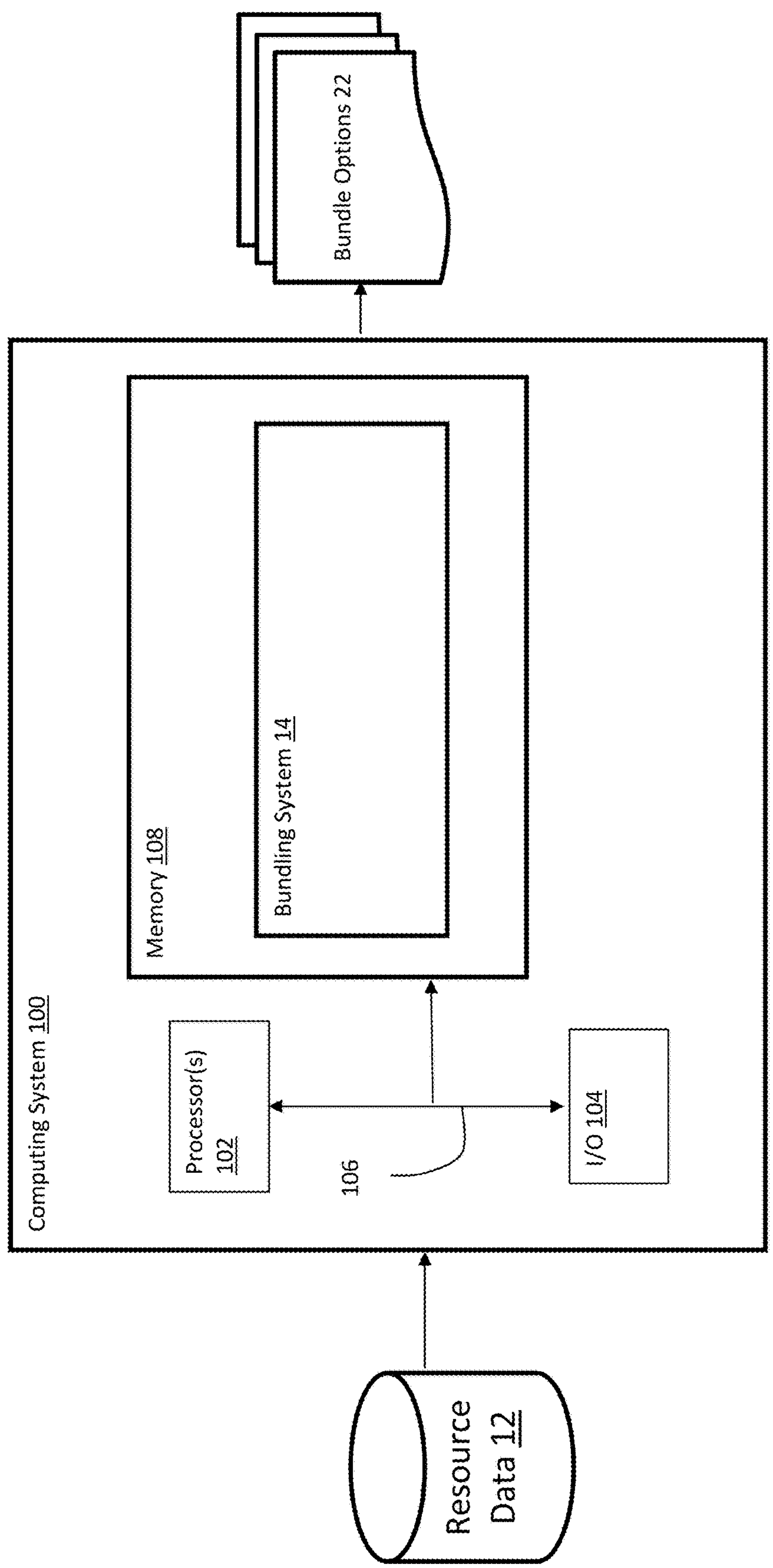
FIG. 8 show a computing system according to embodiments.

It is understood that bundling system 14 as shown in FIG. 8 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 102, memory 108, an input/output (I/O) 104 (e.g., one or more I/O interfaces and/or devices), and a communications pathway 106. In general, processor(s) 102 execute program code which is at least partially fixed in memory 108. While executing program code, processor(s) 102 can process data, which can result in reading and/or writing transformed data from/to memory and/or I/O 104 for further processing. The pathway 106 provides a communications link between each of the components in computing system 100. I/O 104 can comprise one or more human I/O devices, which enable a user to interact with computing system 100. Computing system 100 may also be implemented in a distributed manner such that different components reside in different physical locations.

Furthermore, it is understood that the bundling system 16 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A resource provisioning platform comprising one or more processors and one or more tangible non-transitory storage media for storing programming instructions, the resource provisioning platform comprising:

a plurality of resources, wherein each resource belongs to one of a plurality of categories, and wherein each resource comprises a software resource or a hardware resource;

a bundling system having:

a data collection system that gathers historical transaction data of the resources;

an analysis system that analyzes the historical transaction data to assign estimated valuations to different bundles of resources and includes (a) a substitution effect analyzer to analyze a substitution effect of resources and calculate a marginal valuation in each category using discrete choice modeling and marginal value estimation, and (b) a joint dependence analyzer that determines intra-category and inter-category joint dependent inferences across all resources, wherein the joint dependent inferences include a joint dependent valuation across the plurality of categories based upon the calculated marginal valuation for each category; and a bundle selection system that selects a set of bundles for provisioning based on the estimated valuations.

2. The resource provisioning platform of claim 1, wherein the joint dependence analyzer includes an inter-category covariance estimator to determine inter-category joint dependent inferences, wherein the inter-category covariance estimator includes a CART regression tree algorithm and a pairwise correlation inference system.

3. The resource provisioning platform of claim 2, wherein the joint dependence analyzer further includes:

an intra-category covariance estimator to determine intra-category joint dependent inferences; and a covariance matrix assembly system that combines the results of the intra-category covariance estimator and inter-category joint dependent inferences into a covariance matrix.

4. The resource provisioning platform of claim 3, further comprises a Monte-Carlo joint valuation simulator that processes the covariance matrix.

5. The resource provisioning platform of claim 1, wherein each of the set of bundles includes a calculated utilization schedule.

6. The resource provisioning platform of claim 1, wherein the historical transaction data includes demand data.

7. The resource provisioning platform of claim 1, wherein the resource provisioning platform comprises one of a cloud computing platform, a network infrastructure, a server, an Internet of Things (IoT) platform, an autonomous fleet of vehicles, a distribution system, or a sales model.

8. A computer program product stored on a computer readable storage medium, which when executed by a computing system, provides bundling options for a resource provisioning platform, the program product comprising:

program code that collects historical transaction data of resources;

program code that calculates a substitution effect of resources for each of a plurality of categories using discrete choice modeling and calculates a marginal valuation for each category using a marginal value estimation;

program code that determines intra-category and inter-category joint dependence inferences across all resources, wherein the joint dependent inferences include a joint dependent valuation across the plurality of categories based upon the calculated marginal valuation for each category; and program code that selects a set of bundles for provisioning based on the substitution effect and intra-category and inter-category joint dependent inferences.

9. The program product of claim 8, wherein the inter-category joint dependence inferences includes program code to determine inter-category covariance estimates using a CART regression tree algorithm and a pairwise correlation inferences.

10. The program product of claim 9, further comprising:

program code to that provides an intra-category covariance estimator to determine intra-category joint dependent inferences; and program code that combines the results of the intra-category covariance estimator and inter-category joint dependent inferences into a covariance matrix.

11. The program product of claim 10, further comprising program code that implements a Monte-Carlo joint valuation simulator to process the covariance matrix.

12. The program product of claim 8, wherein each of the set of bundles includes a calculated utilization schedule.

13. The program product of claim 8, wherein the historical transaction data includes demand data.

14. The program product of claim 8, wherein the resource provisioning platform comprises one of a cloud computing platform, a network infrastructure, a server, an Internet of Things (IoT) platform, an autonomous fleet of vehicles, a distribution system, or a sales model.

15. A computerized method of bundling resources for a resource provisioning platform, the method comprising:

collecting historical transaction data of resources;

calculating a substitution effect of resources for each of a plurality of categories using discrete choice modeling and calculating a marginal valuation for each category using a marginal value estimation;

determining intra-category and inter-category joint dependence inferences across all resources, wherein the joint dependent inferences include a joint dependent valuation across the plurality of categories based upon the calculated marginal valuation for each category; and selecting a set of bundles for provisioning based on the substitution effect and intra-category and inter-category joint dependent inferences.

16. The method of claim 15, wherein the inter-category joint dependence inferences determine inter-category covariance estimates using a CART regression tree algorithm and pairwise correlation inferences.

17. The method of claim 16, further comprising:

utilizing an intra-category covariance estimator to determine intra-category joint dependent inferences; and combining the results of the intra-category covariance estimator and inter-category joint dependent inferences into a covariance matrix.

18. The method of claim 17, further comprising implementing a Monte-Carlo joint valuation simulator to process the covariance matrix.

19. The method of claim 17, wherein the resource provisioning platform comprises one of a cloud computing platform, a network infrastructure, an Internet of Things (IoT) platform, a server, an autonomous fleet of vehicles, a distribution system, or a sales model.

20. The method of claim 15, wherein each of the set of bundles includes a calculated utilization schedule.

* * * * *